United States Patent Office 3,548,032
Patented Dec. 15, 1970

3,548,032
HIGH IMPACT POLYSTYRENE AND AN ACRYLATE POLYMER
Gregory F. Ward, Deptford, N.J., assignor to Shell Oil Company, New York, N.Y., a corporation of Delaware
No Drawing. Filed July 20, 1967, Ser. No. 654,932
Int. Cl. C08f 41/12
U.S. Cl. 260—876
4 Claims

ABSTRACT OF THE DISCLOSURE

The elongation and impact resistance of high impact polystyrenes are improved by the addition of small amounts of alkyl methacrylate polymers and their copolymers with N-vinyl pyrrolidones.

FIELD OF THE INVENTION

This invention is concerned with the improvement in physical properties of high impact polystyrenes. More specifically, it is directed to improving the toughness of high impact polystyrenes as expressed in terms of elongation and impact resistance.

Polystyrene is an established article of commerce useful for the production of thermoplastic articles. When high impact properties are desired these are provided to a certain extent by interpolymerization of rubbers with polystyrene. Normally, the interpolymerization is carried out by polymerizing styrene in the presence of rubber although other products may be obtained by physical blending of the rubber with polystyrene. Modifications of these two types of products are also known wherein chemical interpolymerization products are blended with physical mixtures of rubbers and homopolystyrene.

While high impact polystyrenes provide an improvement in certain physical properties of polystyrene, for a number of purposes, these improvements have been found to be something less than sufficient. This is particularly notable in packaging applications, especially where the packaging material is subjected to a thermoforming operation. It has been found that either the thermoforming conditions degrade the rubber phase to an extent that the product no longer has its original high impact properties or, even if such degradation does not occur, the physical properties are not within a range desired or required for certain stringent commercial uses.

It is an object of the present invention to provide improved polystyrene compositions. It is a particular object of the invention to provide high impact polystyrenes having improved physical properties. It is a further object of the invention to provide a high impact polystyrene composition showing improved elongation and impact resistance. Other objects will become apparent during the following detailed description of the invention.

SUMMARY OF THE INVENTION

Now, in accordance with the present invention, improved polystyrene compositions are provided by modification of high impact polystyrene with 0.25–5% by weight based on the high impact polystyrene of an oil dispersible polymer of the group consisting of polymerized $C_{6-18}$ alkyl esters of an acrylic acid and/or copolymers of said esters with 1–20% by weight based on the ester of an N-vinyl pyrrolidone. The presence of the additive polymer has been found to substantially improve the elongation and impact resistance of the high impact polystyrene. This is especially manifested in thermoformed articles but is also noteworthy in the compositions prior to thermoforming such as in sheets or films and the like.

High impact polystyrenes, as outlined hereinabove, usually comprise interpolymers of a rubber with styrene, the rubber usually being present in an amount between about 5% and about 35% by weight based on the high impact polystyrene, i.e., the combined weight of the rubber and the polystyrene. The rubbers suitable for this purpose are not critical in the generic aspects considered in the present invention and may normally comprise single rubbers or mixtures thereof including especially natural or synthetic polymers of conjugated dienes such as butadiene or isoprene, random copolymers of conjugated dienes with monovinylarenes such as styrene, the most noteworthy example of which is the so-called "SBR rubbers" (styrene-butadiene random copolymers), block copolymers of the same monomers which may be represented best by a two-block copolymer, polystyrene-polybutadiene, a three-block copolymer such as polystyrene-polybutadiene-polystyrene, or a tapered block copolymer represented by polybutadiene-(styrene-butadiene tapered block)-polystyrene. Combinations of these rubbers may be utilized to form an entire range of high impact products. Stereo rubbers, i.e., those diene rubbers containing less than about 15% of 1,2-content in the diene portions of the polymer, are preferred. Moreover, the concentrations of these rubbers may be varied in order to alter progressively certain physical characteristics.

High impact polystyrenes are usually produced by an interpolymerization procedure. In a typical process, a diene rubber such as polybutadiene is injected into a reactor containing styrene monomer and polymerization of the latter is allowed to occur either in the absence of any catalyst (thermopolymerization) or in the presence of a catalyst such as a peroxide or lithium alkyl. The polymerization forms not only styrene homopolymer but also, mixed therewith, an interpolymer, by which term is meant grafted polystyrene chains on the backbone of the rubber present during polymerization. The polymerization may proceed through several stages with respect to stirring or quiescent periods and with respect to changes in temperature, no step of which is critical to the production of the compositions contemplated according to the present invention.

Two general classes of additive polymers may be utilized in accordance with the present invention to enhance the toughness of the high impact polystyrenes. The first of these comprises esters of acrylic acids (including acrylic acid or methacrylic acid), particularly where the ester is of at least one aliphatic alcohol having from 6 to 18 carbon atoms per molecule. The alkyl esters of methacrylic acid are preferred for this purpose. Normally, since these are articles of commerce, mixtures of esters are available. The polymers may be homopolymers such as polymethacrylates, copolymers of more than one of the alkyl acrylates or interpolymers of one or more than one alkyl acrylate with one or more than one other copolymerizable carbon-to-carbon unsaturated organic monomer. While the ester hydrocarbon radical may contain from 6 to 18 carbon atoms, it is preferred that it contain from 12 to 18 carbon atoms. The average molecular weight will usually be between about 10,000 and 100,000, preferably between about 20,000 and 60,000.

In addition to or in place of the simple acrylic acid ester polymers, copolymers thereof with N-vinyl pyrrolidones may be utilized. Normally these will have somewhat higher molecular weights in the order of 100,000 to 500,000 and usually within the range from about 125,000 to 400,000. These as well as the class described above should be characterized as "oil dispersible," as contrasted to other similar materials high enough in pyrrolidone content to be characterized as water soluble or water dispersible. In the present instance, in the pyrolidone content is relatively low, in the order of 1–20% by weight of the copolymer, or expressed in other terms, the nitrogen content usually varies from about 0.5 to about 1.5% by weight.

The vinyl pyrrolidones may be unsubstituted or may bear hydrocarbon ring substituents preferably having 1–6 carbon atoms each. The copolymers again may be simple copolymers of a single acrylic acid ester with a single pyrrolidone or may be more complex materials which are copolymers of mixed acrylic acid esters with mixed vinyl pyrrolidones.

The additive polymers and copolymers may be mixed with the high impact polystyrenes under a variety of conditions. Most conveniently, they may be first dispersed in a petroleum fraction such as a lubricating oil or the like but they may if desired be added without such prior treatment. They may be incorporated in the high impact polystyrene either prior to or subsequently to formation of the high impact product. For example, they may be added to the reactor in which the interpolymer is formed prior to initiation of polymerization, during the polymerization process or subsequent thereto. Alternatively, they may be incorporated in the finished product such as by extrusion mixing during the formation of nibs or other particles of the high impact product. If they are added in the course of manufacturing the high impact polystyrene, it is uncertain at the present time whether or not they are chemically incorporated in the interpolymer or simply physically mixed therewith.

The products contemplated may be modified with any of the normal compounding ingredients such as plasticizers, e.g., mineral oils, pigments, dyes, fillers, etc. to suit a particular end use. Preferably they are extruded or formed in sheets (including film) which in turn can be subjected to thermoforming operations or other shaping techniques.

It has been found that the high impact polystyrenes modified with the subject additive polymers exhibited substantially improved elongation and impact resistance as will be seen from the comparative data given in the examples following hereinafter.

EMBODIMENT OF THE INVENTION

Example I

The dart impact factor and ultimate elongation of a high impact polystyrene were determined both in the absence of and in the presence of a number of additive polymers as shown in Table I below. Where the additive polymers were incorporated, this was effected by extrusion blending the high impact polystyrene with a mineral oil dispersion of the polymer (about 30–40% polymer, 70–60% oil). It will be seen from the data contained in the table that there is a substantial improvement in the dart impact factor by the additive of a number of different species of polymers falling within the scope of the present invention. This is also true with respect to the ultimate elongation.

TABLE I.—EFFECT OF POLYMETHACRYLATES ON HIGH IMPACT POLYSTYRENE

| Sample | Blank | 1 | 2 | 3 | 4 | 5 |
|---|---|---|---|---|---|---|
| 1% polymer, 2% oil [1] | None | A | B | C | D | E |
| Dart impact factor,[2] 73° F., ft.-lb./in. | 400 | 1,250 | 865 | 910 | 730 | 750 |
| Dart impact factor,[2] 0° F., ft.-lb./in. | 340 | 400 | 380 | 495 | 320 | 725 |
| Ultimate elongation, percent (based on ASTM D-638-60T) | 34 | 67 | 61 | >50 | 46 |

[1] A poly(lauryl methacrylate) mol. wt. 40,000.
[1] B poly(lauryl mixture methacrylate 300,000 mol wt, 1% N and N-vinyl pyrrolidone).
[1] C [N-vinyl pyrrolidone (about 7%)+C$_{12-18}$ alkyl methacrylate].
[1] D (cetyl (35%) and stearyl (65%) methacrylate copolymer).
[1] E (lauryl, myristyl and cetyl methacrylate copolymer).
[2] Dart Impact Factor=Load in pounds to produce 50% specimen failures×height of dart (26 inches)/specimen thickness (based on ASTM D-1709-59T).

The high impact polystyrene used in these tests contained 91% bound styrene, 6% polybutadiene, 3% SBR, 0.5% antioxidant and 2.5% white mineral oil, all on a weight basis.

Example II

Selective compositions of Example I were thermoformed into the shape of cups to determine if the beneficial effect of the toughening agents carried through the thermoforming operation. Table II below shows that additives E and D (see footnotes to Table I) provided substantially improved cut impact strength compared with the unmodified composition. The high impact polystyrene utilized as the base material for these compositions was the same as that described in Example I. The impact strength test utilized for samples of this description comprised dropping a two pound dart from a variable height onto the molded sample at 23° C., the calculation being that given in the double starred footnote to Table I.

TABLE II.—EFFECT OF POLYMETHACRYLATES ON THERMOFORMED PRODUCT

| Sample | Additive | Cut impact strength, (ft.-lb./in.) |
|---|---|---|
| 6 | None | 48 |
| 7 | Additive E (see Table I footnotes) | 59 |
| 8 | Additive D (see Table I footnotes) | 62 |

Example III

A high impact interpolymer was prepared by interpolymerization of styrene with rubber as an unmodified composition on the one hand and with the same formulation containing as an additional interpolymerizing component 1% by weight of additive D (Table I) together with 2% of added mineral oil (in which the additive had been dispersed). The polymerization recipe included 92 parts by weight of styrene, 6 parts by weight of polybutadiene rubber, 2 parts by weight of SBR and 0.2 parts by weight of antioxidant and 1.25 lubricant. The interpolymerizations were carried out at temperatures between about 105° C. and about 210° C. and the product of the polymerization finished by devolatilization and formation as compression molded samples. Table III below shows the benefit of the methacrylate polymer upon the physical properties of the interpolymer.

TABLE III.—EFFECT OF POLYMETHACRYLATES ON HIGH IMPACT POLYSTYRENE ADDITIVE ADDITION BY INTERPOLYMERIAZTION

| Sample | 9 | 10 |
|---|---|---|
| Additive type | None | ([1]) |
| Falling weight impact strength, ft.-lb./in | 36 | 63 |
| Tensile yield strength, p.s.i | 2,700 | 2,200 |
| Tensile ultimate strength, p.s.i | 2,300 | 2,100 |
| Ultimate elongation, percent | 5.0 | 18 |
| Izod impact strength, ft.-lb./in | 1.6 | 2.1 |

[1] Additive D (see footnotes to Table I).

I claim as my invention:
1. A high impact polystyrene composition comprising
  (a) a major proportion of a styrene-rubber interpolymer, wherein the interpolymer comprises styrene interpolymerized with 5–35% by weight of an elastomer selected from the group consisting of conjugated diene homopolymers, conjugated diene-styrene random copolymers, conjugated diene-styrene block copolymers, and mixture thereof; and
  (b) 0.25–5% by weight, based on the interpolymer of an oil-dispersible polymer of the group consisting of
    (1) homopolymers of $C_{12-18}$ alkyl esters of an acrylic acid selected from the group consisting of acrylic acid and methacrylic acid and
    (2) copolymers of said esters with 1–20% by weight of an N-vinyl pyrrolidone.
2. An article comprising a sheet of the composition according to claim 1.

3. A composition according to claim 1 wherein the component (b) is a polymerized mixture of at least two $C_{12-18}$ alkyl esters of methacrylic acid.

4. A composition according to claim 1 wherein the ester is a $C_{12-18}$ alkyl ester of methacrylic acid.

References Cited

UNITED STATES PATENTS

| 3,446,760 | 5/1969 | Nowak et al. | 260—4 |
| 3,444,271 | 5/1969 | Aliberti | 260—878 |
| 2,806,824 | 9/1957 | Semegen | 260—4 |
| 2,567,016 | 10/1947 | Gessler | 260—45.5 |

MURRAY TILLMAN, Primary Examiner

C. J. SECCURO, Assistant Examiner

U.S. Cl X.R.

260—336